United States Patent
Piket et al.

(10) Patent No.: US 6,415,029 B1
(45) Date of Patent: *Jul. 2, 2002

(54) ECHO CANCELER AND DOUBLE-TALK DETECTOR FOR USE IN A COMMUNICATIONS UNIT

(75) Inventors: James Brian Piket, Gilbert; Lance Foreman Amos, Mesa; Holly Elizabeth Hall, Chandler; William Chunhung Yip, Phoenix, all of AZ (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/317,575

(22) Filed: May 24, 1999

(51) Int. Cl.[7] ................................. H04M 9/08
(52) U.S. Cl. ..................... 379/406.04; 379/406.01; 379/406.02; 379/406.03; 379/406.08; 379/406.12
(58) Field of Search ................... 379/406, 410, 379/411, 409, 407, 402, 389, 387; 455/570, 569, 554, 561, 296; 370/32.1, 286, 287, 288, 289

(56) References Cited

U.S. PATENT DOCUMENTS

| | | | | |
|---|---|---|---|---|
| 3,922,488 A | * | 11/1975 | Gabr | 379/390 |
| 4,817,157 A | * | 3/1989 | Gerson | 381/40 |
| 4,894,820 A | | 1/1990 | Miyamoto et al. | 370/32.1 |
| 5,222,251 A | * | 6/1993 | Roney, IV et al. | 455/54.1 |
| 5,353,348 A | | 10/1994 | Sendyk et al. | 379/410 |
| 5,570,423 A | | 10/1996 | Walker et al. | 379/410 |
| 5,602,913 A | * | 2/1997 | Lee et al. | 379/406 |
| 5,657,384 A | | 8/1997 | Staudacher et al. | 379/388 |
| 5,717,823 A | * | 2/1998 | Kleijn | 395/2.29 |
| 5,764,753 A | | 6/1998 | McCaslin et al. | 379/389 |
| 5,835,851 A | * | 11/1998 | Rasmusson et al. | 455/79 |
| 5,857,167 A | | 1/1999 | Gritton et al. | 702/223 |
| 5,884,194 A | | 3/1999 | Shiraki | 455/570 |
| 6,002,950 A | * | 12/1999 | Muraoka | 455/570 |
| 6,081,732 A | * | 6/2000 | Suvanen et al. | 455/570 |
| 6,192,126 B1 | * | 2/2001 | Koski | 379/410 |

* cited by examiner

Primary Examiner—Forester W. Isen
Assistant Examiner—Ramnandan Singh
(74) Attorney, Agent, or Firm—Ingrassia Fisher & Lorenz; Frank J. Bogacz (57) ABSTRACT

A hands-free communications unit employs a downlink peak power memory element (150, FIG. 1), a downlink voice activity detector (140), and an uplink voice activity detector (180). The downlink voice activity detector (140) evaluates the incoming signal to determine if the signal includes voice. In a similar manner, the uplink voice activity detector (180) determines if an outgoing signal includes voice. In the event that the incoming signal includes voice and the energy of the outgoing signal exceeds a threshold calculated from the peak power of the incoming signal, the uplink voice activity detector (180) indicates that a double-talk condition exists (350, FIG. 3). In the event that the incoming signal does not include voice, the uplink voice activity detector (180) compares the uplink signal to a voice threshold above a noise floor to determine if the outgoing signal includes voice.

10 Claims, 5 Drawing Sheets

ECHO CANCELER AND DOUBLE-TALK DETECTOR FOR USE IN A COMMUNICATIONS UNIT

FIELD OF THE INVENTION

The invention relates generally to the field of communications and, more particularly, to the use of echo cancellation and double-talk detection in communications units.

BACKGROUND OF THE INVENTION

In a hands-free communication unit, received audio is conveyed to a user, or a group of co-located users, through a speaker system. This allows a user to listen to voice transmissions from a transmitting station without requiring the user to wear a headset or hold a telephone earpiece in order to hear transmissions from a far-end transmitter. Additionally, a hands-free communications unit allows a group of co-located users to participate in a conversation with another user located at a far-end transmitter in a natural manner.

When a transmission from a far-end transmitter is received and conveyed to a user through a speaker, a portion of the audio from the speaker is typically coupled into the microphone of the hands-free communications unit at the receiving end. This is primarily due to the fact that the speaker and microphone are usually placed within close proximity of each other. Thus, the hands-free communications unit must discriminate between audio signals coupled into the microphone which result from speaker echo as well as voice signals from the user or group of users.

When a user is talking while a signal is being received from a far-end transmitter, this condition is referred to as double-talk. Typically, a hands-free communications unit employs some technique of determining if the user is talking, and if a signal from a far-end transmitter is being received while the user is talking. Current double-talk detectors make use of attenuators in order to reduce the audio output of the speaker which, in turn, reduces the level of the echo coupled into the microphone of the hands-free communications unit. However, this attenuation produces an unnatural condition where the users of the hands-free communications unit hear an intermittently attenuated version of the signal from the far-end transmitter.

Other techniques employ the use of a linear model in order to estimate the audio level of the signal from the far-end transmitter in order to subtract the echo from the outgoing audio signal. Typically, these techniques then compare the power of the outgoing signal to the power of the received signal in an attempt to determine if the outgoing signal contains speech in a potential double-talk condition. In addition to being highly dependent on the performance of a recursive filter, these techniques often rely on fixed thresholds and an implicit time dependency in the relationship between the outgoing and incoming signals. These factors limit the accuracy of current techniques. Alternatively, methods of monitoring deviations of the recursive filter coefficients which indicate divergence due to an outgoing signal can be used. However, such techniques are computationally expensive and highly dependent on the effectiveness of the recursive filter.

Therefore, it is highly desirable for the hands-free communications unit to employ an echo cancellation mechanism with improved double-talk accuracy which requires minimal processing resources and allows for changes in the timing of the echoed signal as it is radiated from the speaker and coupled into the microphone. Such a system would result in a lower cost hands-free communications unit which provides the capability to engage in a natural conversation between users of the hands-free communications unit and a far-end transmitter.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures.

DESCRIPTION OF THE PREFERRED EMBODIMENTS

An echo canceler and double-talk detector provides a capability for a hands-free communications unit to detect voice from a far-end transmitter in the presence of outgoing voice (double-talk). According to one aspect of be invention, a downlink peak power memory element is used in conjunction with a method of adaptive noise floor tracking and state-dependent outgoing voice activity detection in order to provide increased voice detection capability under a wide range of operating conditions. According to another aspect of the invention, increased voice activity detection accuracy allows an enhanced full duplex echo cancellation system for use with hands-free communications units.

Figure 1:
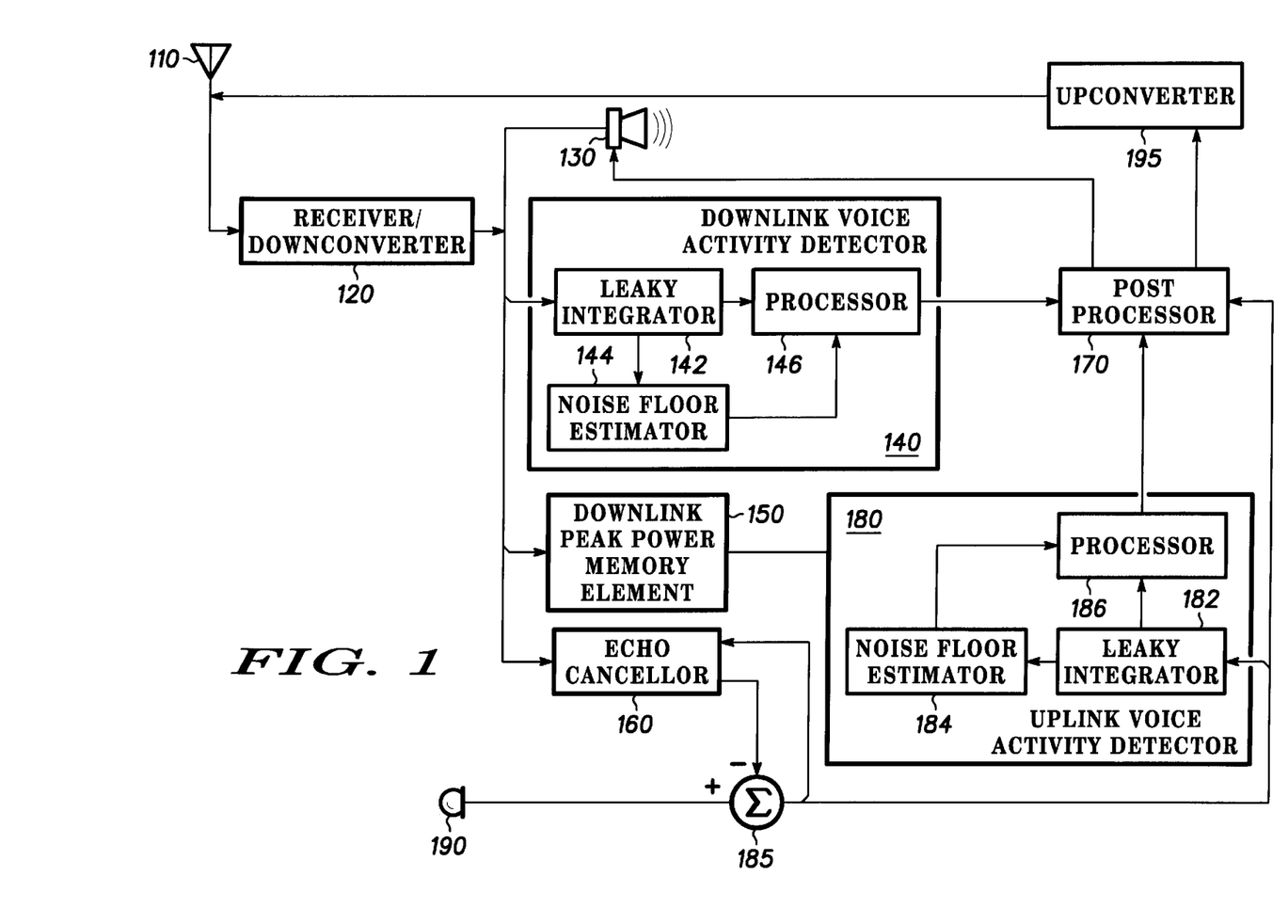
FIG. 1 is a block diagram of the a echo canceler and double-talk detector in accordance with a preferred embodiment of the invention.

FIG. 1 is a block diagram of an echo canceler and double-talk detector in accordance with a preferred embodiment of the invention. The apparatus of FIG. 1 may be used in a wireless device, such as a cellular telephone or an accessory to a cellular telephone, which receives and transmits signals to a far-end user by way of a satellite communications system, or a terrestrial cellular infrastructure. In FIG. 1, signals from a far-end transmitter are received through antenna 110. In a preferred embodiment, signals received through antenna 110 may be modulated using a frequency domain multiple access (FDMA) technique, a time division multiple access (TDMA) technique, a code division multiple access (CDMA) technique, or a combination of two or more of the aforementioned techniques.

The received signals are conveyed from antenna 110 to receiver/down converter 120. Receiver/down converter 120 functions to reduce the operating frequency of the signals received through antenna 110 to a base band frequency. Receiver/down converter 120 preferably includes the necessary demodulation and processing equipment in order to remove audio information from the modulated signal. The base band audio signals from receiver/down converter 120 are conveyed to speaker 130, downlink voice activity detector 140, downlink peak power memory element 150, and echo canceler 160. Speaker 130 reproduces the voice signal of the user of the far-end transmitter and presents this audio to one or more users. Speaker 130 may incorporate control features which reduce or increase the audio gain of the reproduced audio signal. Other controls, such as those used to modify the tone of the reproduced signal, may also be included in speaker 130.

Figure 2:
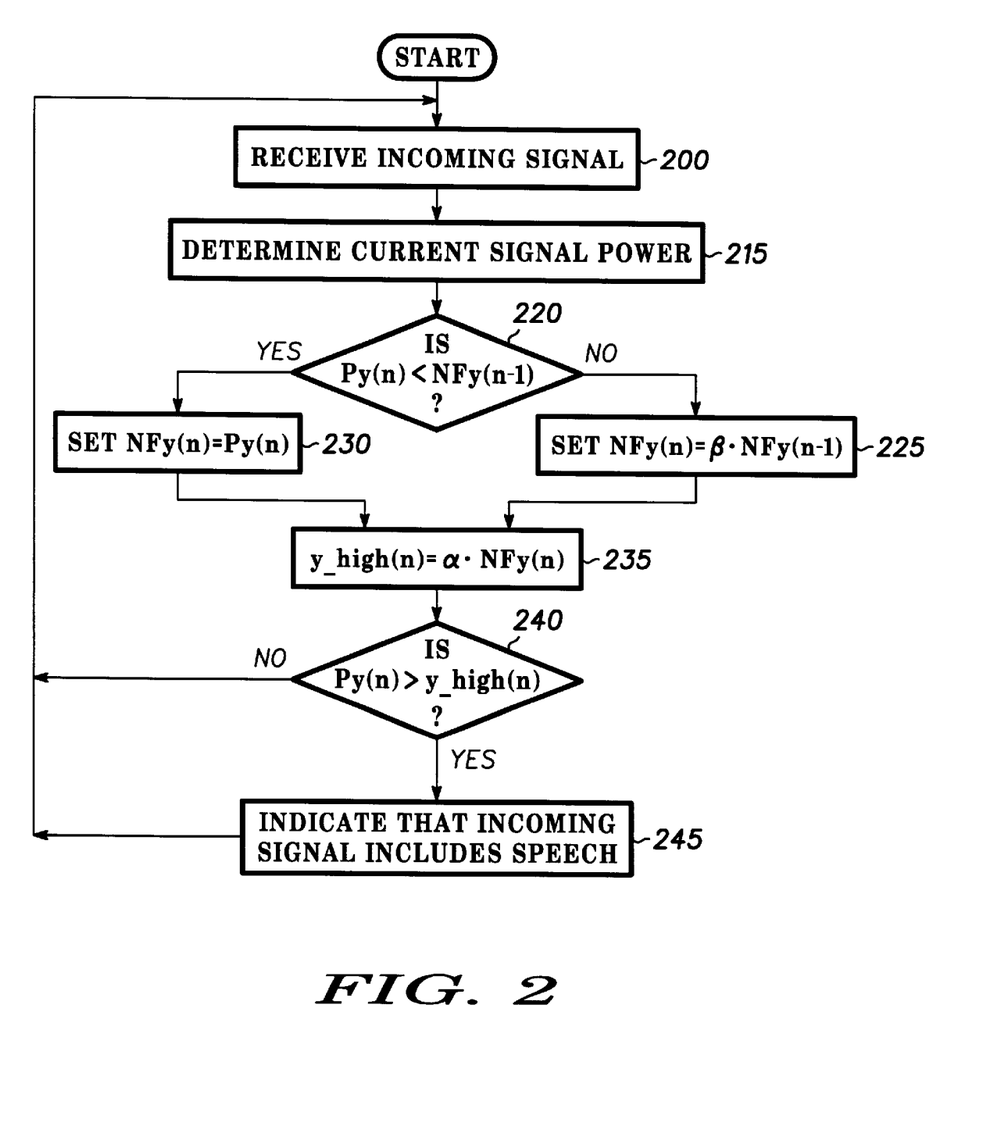
FIG. 2 is a flow chart of a detailed method executed by a downlink voice activity detector in accordance with a preferred embodiment of the invention.

Downlink voice activity detector 140 also receives the base band audio signals from receiver/down converter 120 in order to determine whether the audio signal includes voice or consists purely of noise. A more detailed description of the operations performed by downlink voice activity detector 140 can be found in reference to FIG. 2. In a preferred embodiment, downlink voice activity detector 140 includes leaky integrator 142, noise floor estimator 144, and processor 146 which coordinates and controls the activities of leaky integrator 142 and noise floor estimator 144. Downlink voice activity detector 140 periodically samples the base band audio signal and estimates a current signal power using leaky integrator 142. In a preferred embodiment, the following equation is used by leaky integrator 142 to estimate the current signal power. This $$P_y(n)=(1-\gamma)y^2(n)+\gamma P_y(n-1),$$

where $\gamma \approx 0.9875$ (Integration factor)

As expressed in the above equation, the current signal power is derived from the current instantaneous signal power (represented by $y^2.(n)$) as well an historical estimate of the signal power (represented by $P_y(n-1)$).

Using the estimates of current signal power, noise floor estimator 144 applies a slow rise/fast fall method. Each estimate of current signal power is compared to the current noise floor estimate. If the current signal power estimate is less than the noise floor estimate, downlink voice activity detector 140 interprets this condition as being representative of a drop in the noise level. When this occurs, a new noise floor estimate is set equal to the current signal power estimate to produce the desired fast fall in the noise floor. Should the current signal power estimate exceed the noise floor estimate, downlink voice activity detector interprets this condition as being representative of a rise in the noise level. When this occurs, a ramping factor is applied to produce a slow rise ramping of the current noise floor estimates at a rate of β dB per second. This process can be represented by way of the following expression:

If $$(P_y(n)<NF_y(n-1))$$

then $$NF_y(n)=P_y(n)$$

else $$NF_y(n)=\beta(NF_y(n-1))$$

where $\beta \approx 2$ to 8 dB per second rise rate endif.

In a preferred embodiment, downlink voice activity detector continues to indicate that voice is present in the received audio signal from receiver down converter 120 for a short period of time after voice is no longer detected. By way of example, and not by way of limitation, this duration preferably does not exceed 300 milliseconds. By continuing to indicate voice activity for a period of time after voice is no longer detected, downlink voice activity detector 140 allows the inter-phrase pauses which occur during normal voice to be correctly identified as voice. Those skilled in the art may refer to this as "hangover".

When noise floor estimator 144 has estimated the noise floor of the incoming audio signal, these results are used to set a voice activity threshold. In a preferred embodiment, the voice threshold is set approximately in the range of 4 to 8 dB above the noise floor. The higher of the two thresholds (8 dB) is used to signal voice "inactive" to voice "active" state transitions. The lower (4 dB) threshold provides a hysteresis for the voice activity state and is used to signal voice "active" to voice "inactive" state transitions. By basing the voice activity thresholds on an adaptive noise floor, reliable voice detection is achievable under even the most challenging background noise conditions. Additionally, the minimum and maximum allowable thresholds are bounded in order to prevent oversensitive voice activity detection in quiet environments and to improve sensitivity in high noise environments.

In an environment where the background noise level is rising, the noise floor estimate from noise floor estimator 144 correspondingly rises. In turn, this increases the voice activity thresholds which prevent a gradual rise in the noise level from being falsely detected as voice. Additionally, a sharp rise in the noise level is quickly compensated for as the noise floor estimate is ramped to meet the new noise level. This allows noise floor estimator 144 to correctly identify the new energy level as purely consisting of noise. Even under extreme noise conditions, which can cause serious problems for fixed threshold voice activity detectors, downlink voice activity detector 140 is useful at correctly discriminating between noise and voice signals. As noise signals typically measure between three to 3 and 5 dB peak-to-peak, the placement of the voice activity threshold at 8 dB above the noise floor allows for proper detection of voice signals as a little as 3 dB above the background noise level.

Noise floor estimator 144 of downlink voice activity detector 140 is coupled to uplink voice activity detector 180. Uplink voice activity detector 180 performs many of the same functions as downlink voice activity detector 140 as well as additional tasks related to the detection of outgoing voice. In a preferred embodiment, uplink voice activity detector 180 includes leaky integrator 182, noise floor estimator 184, and processor 186 which coordinates and controls the activities of leaky integrator 182 and noise floor estimator 184. A more detailed description of the operations performed by uplink voice activity detector 180 can be found in reference to FIG. 3.

When downlink voice activity detector 140 indicates that voice is not present, processing within uplink voice activity detector 180 is simplified. In this case, uplink voice activity detector 180 is not required to discriminate an audio signal echoed from speaker 130 coupled through microphone 190, since it can be expected that the signal from microphone 190 will include only outgoing voice. However, when downlink voice activity detector 140 indicates that received audio is present, uplink voice activity detector 180 is required to perform additional processing in order to discriminate audio coupled from speaker 130 into microphone 190 as well as outgoing voice signals.

Downlink peak power memory element 150 receives base band audio signals from receiver/down converter 120. In a preferred embodiment, downlink peak power memory element 150 stores a number of samples of the incoming signal power. Preferably, the number of samples stored is approximately in the range of 256 to 1024 (32 to 128 milliseconds using a 8 kHz sampling rate). Desirably, the number of samples corresponds to an amount approximately equal to 64 milliseconds of audio signal energy; however, a greater or lesser number may be used according to the individual requirements of the particular application. By storing historical values of received audio signal power, downlink peak power memory element 150 is capable of effectively removing the time dependency of the echo from speaker 130 coupled through microphone 190. Thus, variations in the time delay of an audio signal from speaker 130 to microphone 190 due to changes in propagation time of the echo, dispersion, or other time domain phenomena do not affect the removal of the echo from the signal received through microphone 190 or the accuracy of the double-talk detection. This results in a robust signal detection mechanism that is relatively insensitive to the echo delay from speaker 130 to microphone 190.

The method used by downlink peak power memory element to search for the peak audio power value over a given interval can be described as follows:

$x\_max\_power = x\_power[0]$;

for $(I=1; I < MEMORY\_LENGTH; I++)$ if $(x\_max\_power < x\_power[I])$ $x\_max\_power = x\_power$ Where MEMORY_LENGTH is preferably a value between 256 and 1024.

Downlink peak power memory element 150 is coupled to uplink voice activity detector 180. This enables downlink peak power memory element 150 to convey an actual value for the peak receive audio signal power (x_max_power) to uplink voice activity detector 180. This estimate is used by uplink voice activity detector 180 to determine if a double-talk condition exists. When the peak audio power from downlink peak power memory element 150 exceeds a double-talk threshold, uplink voice activity detector 180 identifies this as a double-talk condition. In practice, this threshold, σ, is generally in the range of 15 dB below the output power level of speaker 130, but can be greater or less than this value based on a variety of factors. For example, in some applications, this threshold can be as high as 5 dB above the output level of speaker 130 depending on the relative locations of the speaker and microphone.

If the audio signal from microphone 190 remains below the predetermined threshold, uplink voice activity detector 180 does not indicate the double-talk condition. This method can be summarized using the following expression:

if $(down\_vad==1)$ /*Potential double talk situation*/ if $(Py(n) > \sigma \cdot x\_max\_power)$ $up\_vad=1$; /*Double talk detected*/

Echo canceler 160 also receives base band audio from receiver down/converter 120. In a preferred embodiment, echo canceler 160 is a time domain recursive filter which removes the linear components of the echo received through receiver/down converter 120. Echo canceler 160 receives the base band audio from receiver/down converter 120 and filters this inputs to produce a linear estimate of the echo. This estimate is then phase shifted by 180 degrees so that an out-of-phase version of the estimate of the estimate can be subtracted from the original echo resulting in an error signal at an output of summing unit 185. Desirably, the result of this summation by summing unit 185 is conveyed back to echo canceler 160 thus allowing echo canceler 160 to adjust the value of the output signal of summing unit 185 in order to drive the error signal to a minimum value. The residual of the incoming signal echo is input to uplink voice activity detector 180. Thus, the double-talk threshold, σ, can be an overall coupling level between the speaker and microphone which includes a measure of the effectiveness of echo canceler 160.

The output of uplink voice activity detector 180 is conveyed to post processor 170. Post processor 170 can employ a number of techniques to mitigate the effects of the double-talk condition detected by uplink voice activity detector 180. By way of example, and not by way of limitation, post processor 170 may simply adjust the audio gain from speaker 130 to minimize the echo when a double-talk condition has been detected. Post processor 170 can also employ other appropriate techniques known to those of skill in the art in response to the double-talk condition.

Post processor 170 is coupled to up converter 195 in order to allow outgoing voice from microphone 190 to be transmitted to the far-end user through antenna 110. Up converter 195 desirably employs the necessary modulation and mixing elements required to convert the outgoing voice signal to a higher frequency signal in order to radiate the signal by way of antenna 110.

In an alternate embodiment, a substantial portion of the echo canceler and double-talk detector of FIG. 1 may be used in a wireline telephone communications unit. In this embodiment, antenna 110, receiver/down converter 120, and up converter 195 can be removed, and the incoming and outgoing audio signals are conveyed to and from the communications unit using base band audio.

FIG. 2 is a flow chart of a detailed method executed by a downlink voice activity detector in accordance with a preferred embodiment of the invention. The apparatus of downlink voice activity detector 140 of FIG. 1 is suitable for performing the method of FIG. 2. At step 200, an incoming audio signal is received. In step 215, the current signal power of the incoming audio signal are determined. In a preferred embodiment, step 215 includes applying a leaky integrator preferably similar to that described in reference to downlink voice activity detector 140 of FIG. 1. In step 215, the leaky integrator is used to develop an estimate of the signal current power estimate, $P_y(n)$. In step 220, the incoming signal is analyzed to determine if $P_y(n) < NF_y(n-1)$. If $P_y(n) < NF_y(n-1)$, then step 230 is executed where $NF_y(n)$ is set equal to $P_y(n)$. If, however the decision of step 220 indicates that $P_y(n) >$ or $= NF_y(n-1)$, then $NF_y(n)$ is set equal to $\beta \cdot NF_y(n-1)$, as in step 225.

In step 235, a voice activity factor, α, is applied to $NF_y(n)$ and this quantity is set equal to y_high(n). In step 240, the value for $P_y(n)$, from step 220, is compared with y_high(n). If the comparison of step 240 indicates that $P_y(n) > y\_high(n)$, then step 245 is executed where the downlink voice activity detector indicates that the incoming signal includes voice, and the method returns to step 200. If, however, the decision of step 240 indicates that $P_y(n) <$ or $= y\_high(n)$, the method returns to step 200 without indicating that the incoming signal includes voice.

Figure 3:
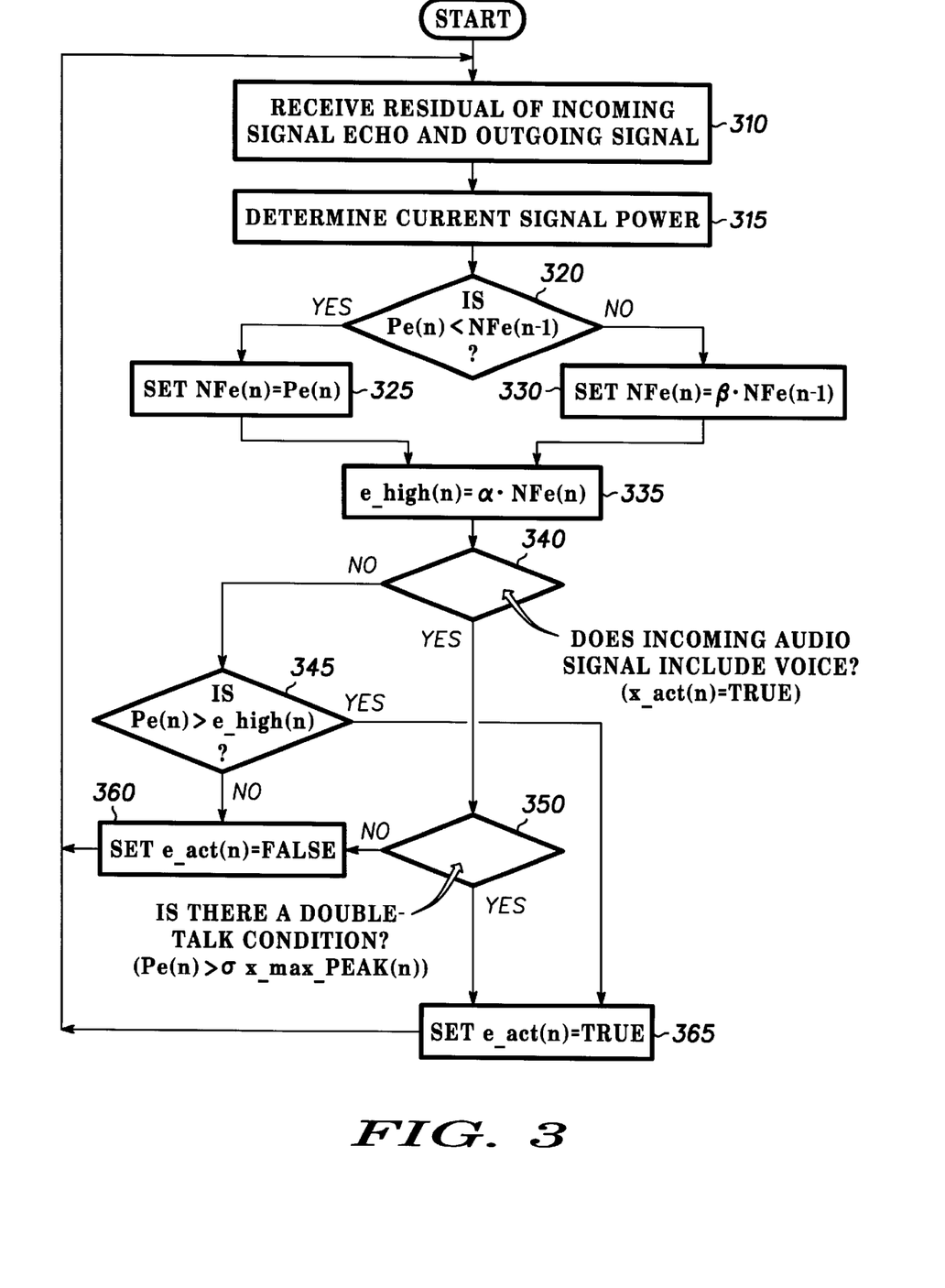
FIG. 3 is a flow chart of a detailed method executed within an uplink voice activity detector in accordance with a preferred embodiment of the invention.

FIG. 3 is a flow chart of a detailed method executed within an uplink voice activity detector in accordance with a preferred embodiment of the invention. The apparatus of uplink voice activity detector 180 of FIG. 1 is suitable for performing the method of FIG. 3. In step 310, a residual of an incoming signal echo and an outgoing signal from a microphone are received. In step 315, the signal power is determined using a leaky integrator similar to that described for FIG. 2. However, in contrast to the discussion of FIG. 2, the outputs of the leaky integration and noise floor estimation processes result in $P_e(n)$ and $NF_e(n-1)$ as opposed to $P_y(n)$ and $NF_y(n-1)$.

In step 320, the current signal power $P_e(n)$ is compared to the noise floor estimate, $NF_e(n-1)$. If the decision of step 320 indicates that $P_e(n)<NF_e(n-1)$, step 325 is executed wherein $NF_e(n)$ is set equal to $P_e(n)$. If, however the decision of step 320 indicates that $P_e(n)$ is > or $=NF_e(n-1)$, then $NF_e(n)$ is set equal to $\beta \cdot NF_e(n-1)$ in step 330. Step 335 is then performed in which the value of $NF_e(n)$ is multiplied by the voice activity factor, $\alpha$, and set equal to e_high(n).

In step 340, the incoming audio signal is evaluated to determine if voice is included in the signal. This determination can be made using a mechanism similar to downlink voice activity detector 140 of FIG. 1. If the incoming audio signal does not include voice, step 345 is executed in which $P_e(n)$ is compared with e_high(n). If the result of this comparison indicates that $P_e(n)>$e_high(n), indicating that the outgoing signal includes voice and that an incoming signal does not include voice, then e_act(n) is to set equal to "true" in step 365. The method then returns to start. If however the comparison of step 345 indicates that $P_e(n)<$ or $=$e_high(n), indicating that neither the outgoing nor incoming signals include voice, step 360 is executed where e_act(n) is set to "false".

If the decision of step 340 indicates that the incoming audio signal includes voice, the possibility for a double-talk condition exists. In step 350, the value of a downlink peak power (such as x_max_power as introduced in reference to FIG. 1) from a suitable downlink peak power memory element, is multiplied by a threshold factor, $\sigma$, and compared to $P_e(n)$. If the comparison of step 350 indicates that $P_e(n)>\sigma \cdot$x_max_power, indicating that both the incoming and outgoing signals include voice, the uplink voice activity detector identifies this as a double-talk condition and step 365 is executed where e_act(n) is set to "true". The method then returns to step 310. If, however, the comparison of step 350 indicates that $P_e(n)<$ or $=\sigma \cdot$x_max_power, indicating that the outgoing signal does not include voice while the incoming signal does include voice, step 360 is executed where e_act(n) is set to "false".

Figure 4:
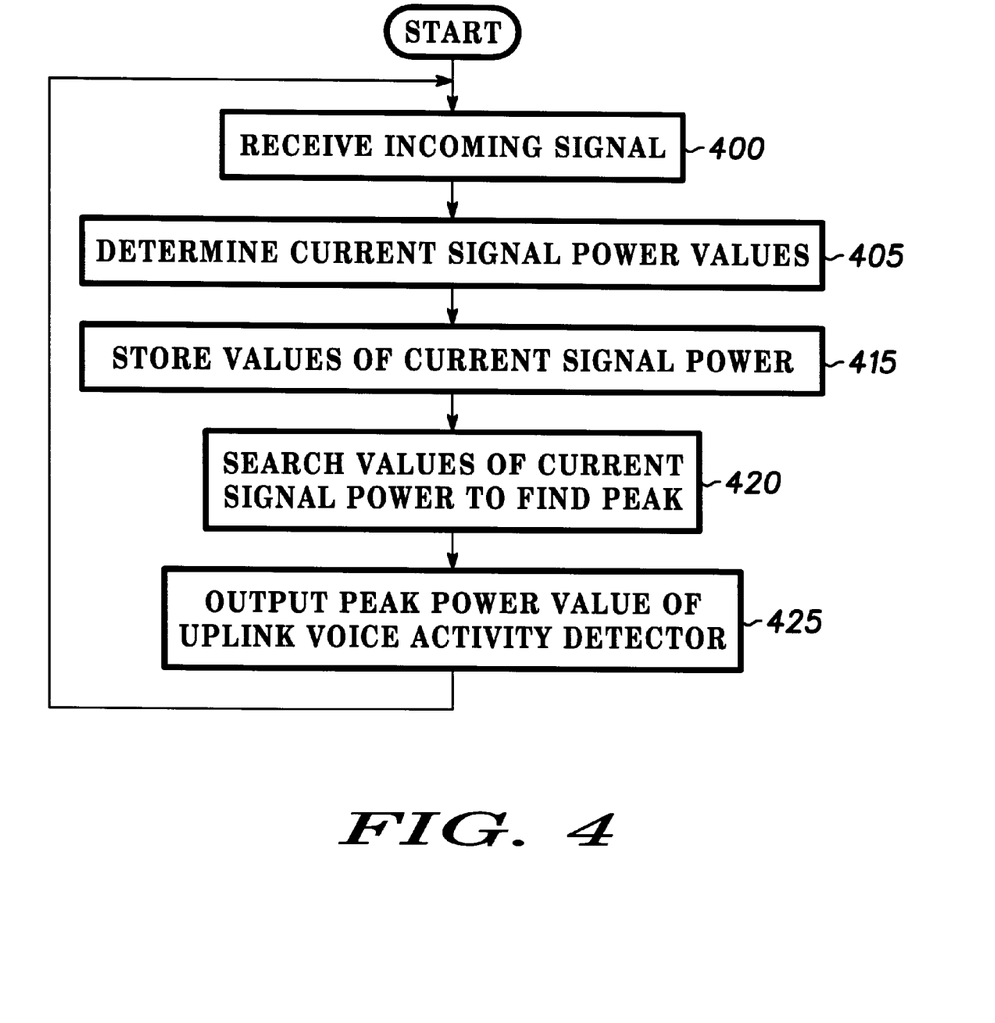
FIG. 4 is a flow chart of a detailed method executed within a downlink peak power memory element in accordance with a preferred embodiment of the invention.

FIG. 4 is a flow chart of a detailed method executed within a downlink peak power memory element in accordance with a preferred embodiment of the invention. The method of FIG. 4 may be carried out by downlink peak power memory element 150 of FIG. 1 and provides additional details of the method used by downlink peak power memory element to search for the peak audio power value over a given interval. The method of FIG. 4 begins with step 400 where an incoming signal is received. At step 405, the current power values of the incoming signal are determined. In step 415, the values of the current signal power are stored in a suitable array or other logical storage element. In step 420, the values are searched in order to find the peak value, x_max_power. In step 425, the results of the peak search of step 420 are conveyed to an uplink voice activity detector.

Figure 5:
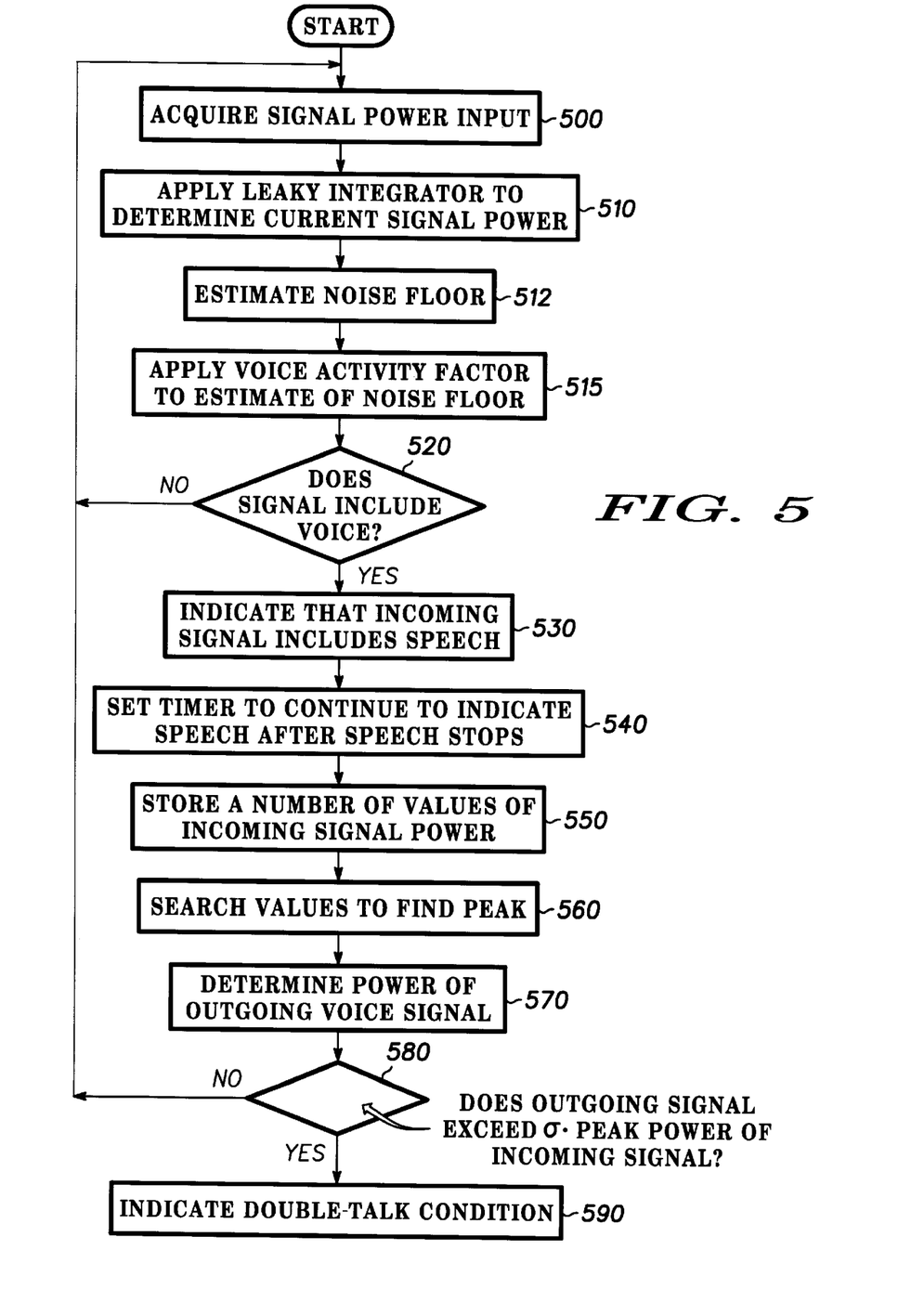
FIG. 5 is a flow chart of a method for double-talk detection in accordance with a preferred embodiment of the invention.

FIG. 5 is a flow chart of a method for double-talk detection in accordance with a preferred embodiment of the invention. The apparatus of FIG. 1 is suitable for performing the method of FIG. 5. The method begins at step 500 where a receive audio signal power input is measured. At step 510, a leaky integrator is applied to the signal power from step 500 in order to determine a current signal power. At step 512, the current signal power is used to determine a noise floor estimate of the current signal power. In step 515, a voice activity factor is applied to the estimate of the noise floor estimated in step 512.

At step 520, a determination is made as to whether the received audio signal includes voice. If the result of step 520 indicates that the audio signal contains voice, step 530 is executed in which an indication is made that a voice signal is present. In step 540, a timer is set in order to preclude inter-phrase pauses from being interpreted as periods of voice inactivity. If however the determination of step 520 identifies that the incoming audio signal is not include voice, the method returns to step 500.

In step 550, a number of values of incoming signal power are stored. In a preferred embodiment, this number is approximately in the range a 256 to 1024 values. In step 560, the number of values is searched in order to find the maximum value. In step 570, an outgoing voice signal, such as a signal from a microphone or an echo canceler, is measured in order to determine the signal power level. In step 580, a determination is made as to whether the outgoing signal exceeds the threshold calculated using the peak power of the incoming signal. If the decision of step 580 indicates that the outgoing signal exceeds the threshold of the incoming audio signal, a double-talk condition is identified in step 590. If however the decision of step to 80 indicates that the peak power of the outgoing signal does not exceed the incoming signal, the method returns to step 500.

An echo canceler and double-talk detector provides a capability for a hands-free communications unit to detect voice from a far-end transmitter in the presence of double-talk. The invention provides an enhanced full duplex echo cancellation system for use with hands-free communications units. These communications units may take the form of accessories to hand-held cellular communications units, or other types of portable communications units which communicate with a far-end transmitter using a wireless or wireline interface. According to one aspect of the invention, a downlink peak power memory element is used in conjunction with a method of adaptive noise floor tracking and state-dependent outgoing voice activity detection in order to provide increased voice detection capability under a wide range of operating conditions.

Accordingly, it is intended by the appended claims to cover all modifications of the invention that fall within the true spirit and scope of the invention.

What is claimed is:

1. A double-talk detector for use in a communications unit, comprising:

a down converter for receiving a signal and converting said signal to a base band frequency signal;

a downlink voice activity detector coupled to said down converter for determining whether said base band frequency signal includes voice and continuing to indicate that said base band frequency signal includes voice for a predetermined period after said downlink voice activity detector ceases to determine that said base band frequency signal includes voice, said downlink voice activity detector comprising:

leaky integrator for generating a current signal power estimate from an historical signal power and a current instantaneous signal power; and a noise floor estimator coupled to said leaky integrator and configured to apply a slow rise/fast fall for adaptively generating a noise floor estimate of said base band frequency signal using said current signal power estimate and generating a voice activity threshold based at least in part upon said noise floor estimate that is utilized in a comparison for said determining whether said base band frequency signal includes voice;

a downlink peak power memory element configured to receive said base band frequency signal from said down converter and configured to store a plurality of samples of said base band frequency signal and determine a peak signal power estimate of said base band frequency signal over an interval of said plurality of samples;

an uplink voice activity detector coupled to said downlink peak power memory element and said downlink voice activity detector, said uplink voice activity detector for detecting double-talk, said double-talk detected by said uplink voice activity detector when power of an outgoing voice signal is greater than a predetermined threshold above said peak signal power estimate of said base band frequency signal;

a post processor coupled to said uplink voice activity detector and configured to mitigate double-talk effects when said uplink voice activity detector detects said double-talk;

a second leaky integrator for generating a second current signal power estimate of said outgoing voice signal from a second historical signal power and a second current instantaneous signal power; and a second noise floor estimator coupled to said second leaky integrator and configured to adaptively generate a second noise floor estimate of said outgoing voice signal using said second current signal power estimate.

2. The double-talk detector for use in the communications unit of claim 1, said slow rise/fast fall for adaptively generating said noise floor estimate of said base band frequency signal comprising:

comparing said current signal power estimate to said noise floor estimate;

interpreting a drop in a noise level of said base band frequency signal and updating said noise floor estimate with said current signal power estimate to produce a fast fall in said noise level if said current signal power estimate is less than said noise floor estimate; and interpreting a rise in said noise level of said base band frequency signal and applying a ramping factor to said noise floor estimate to produce a slow rise in said noise level is said current signal power estimate is greater than said noise floor estimate.

3. The double-talk detector for use in the communications unit of claim 1, wherein said voice activity threshold is approximately in the range of four (4) to eight (8) db above said noise floor estimate.

4. The double-talk detector of claim 1, wherein said double-talk detector is an accessory to a cellular telephone.

5. The double-talk detector of claim 1, wherein said double-talk detector is used within a wire-line communications units.

6. A hands-free communications unit, which detects a double-talk condition, comprising:

a speaker for conveying an incoming audio signal;

a microphone for conveying an outgoing audio signal;

a downlink voice activity detector coupled to said speaker for determining whether said incoming audio signal includes voice, said downlink voice activity detector configured to continue to indicate that said incoming audio signal includes voice for a predetermined period after said incoming audio signal ceases to include voice, said downlink voice activity detector comprising:

a leaky integrator for generating a current signal power estimate from a historical signal power and a current instantaneous power; and a noise floor estimator coupled to said leaky integrator and configured to apply a slow rise/fall for adaptively generating a noise floor estimate of said incoming audio signal using said current signal power estimate and generating a voice activity threshold based at least in part upon said noise estimate that is utilized in a comparison for said determining whether said incoming audio signal includes voice;

a downlink peak power memory element configured to receive said incoming audio signal from said downlink voice activity detector and configured to store a plurality of samples of said incoming audio signal and determine a peak power of said incoming audio signal over an interval of said plurality of samples;

an uplink voice activity detector coupled to said downlink peak power memory element and to said microphone, said uplink voice activity detector detecting said double-talk condition when power of an outgoing voice exceeds a double-talk threshold, said double-talk threshold being calculated using said peak power of said incoming audio signal; and a post processor coupled to said uplink voice activity detector for responding to said double-talk condition when said uplink voice activity detector detects said double-talk condition, said post processor is additionally coupled to said speaker for said responding to said double-talk condition comprising adjusting an audio gain of said incoming audio signal;

a second leaky integrator for generating a second current signal power estimate of said outgoing audio signal from a second historical signal power and a second current instantaneous signal power; and a second noise floor estimator coupled to said second leaky integrator and configured to adaptively generate a second noise floor estimate of said outgoing audio signal using said second current signal power estimate.

7. The hands-free communications unit of claim 6, said slow rise/fast fall for adaptively generating said noise floor estimate of said base band frequency signal comprising:

comparing said current signal power estimate to said noise floor estimate;

interpreting a drop in a noise level of said incoming audio signal and updating said noise floor estimate with said current signal power estimate to produce a fast fall in said noise level if said current signal power estimate is less than said noise floor estimate; and interpreting a rise in said noise level of said incoming audio signal and applying a ramping factor to said noise floor estimate to produce a slow rise in said noise level is said current signal power estimate is greater than said noise floor estimate.

8. The hands-free communications unit of claim 6, wherein said voice activity threshold is approximately in the range of four (4) to eight (8) db above said noise floor estimate.

9. The hands-free communications unit of claim 6, further comprising an echo canceller coupled to said speaker for producing an out-of-phase version of an estimate of an echo of said incoming audio signal.

10. The hands-free communications unit of claim 9, further comprising a summing unit coupled to said echo canceller for summing an out-of-phase version of said estimate with said outgoing audio signal.

* * * * *